United States Patent
Salem et al.

(10) Patent No.: US 7,353,691 B2
(45) Date of Patent: Apr. 8, 2008

(54) HIGH PERFORMANCE GENERATOR STATOR LEAK MONITORING SYSTEM

(75) Inventors: Sameh Salem, Rexford, NY (US); James C. Powzyk, Schenectady, NY (US); Ronald I. Longwell, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 10 days.

(21) Appl. No.: 11/445,273

(22) Filed: Jun. 2, 2006

(65) Prior Publication Data

US 2007/0277593 A1 Dec. 6, 2007

(51) Int. Cl.
*G01M 3/04* (2006.01)
(52) U.S. Cl. .......................................... 73/40.7
(58) Field of Classification Search ................. 73/40.7
See application file for complete search history.

(56) References Cited

U.S. PATENT DOCUMENTS 5,492,004 A * 2/1996 Berg et al. ................... 73/40.7

* cited by examiner

*Primary Examiner*—Hezron Williams
*Assistant Examiner*—John Fitzgerald
(74) *Attorney, Agent, or Firm*—Nixon & Vanderhye, PC

(57) ABSTRACT

A method of measuring hydrogen leakage from a generator core into generator coolant water flowing through the generator stator windings comprising the steps of: providing a core hydrogen gas environment within the generator; flowing coolant water in a flowpath through the generator stator windings and a conduit to a coolant water reservoir; flowing air at a rate of less than 0.15 into the conduit and the coolant water after the coolant water exits the stator windings; measuring the quantity of air flowing into the conduit and into the coolant water; venting gas through a vent line from a contained vapor space over the coolant water within the coolant water reservoir; and measuring the hydrogen content of the gas vented from the reservoir; whereby hydrogen leakage from the generator core environment through the stator windings into the generator coolant water can be determined in amounts down to about 0.2 CFD.

10 Claims, 1 Drawing Sheet

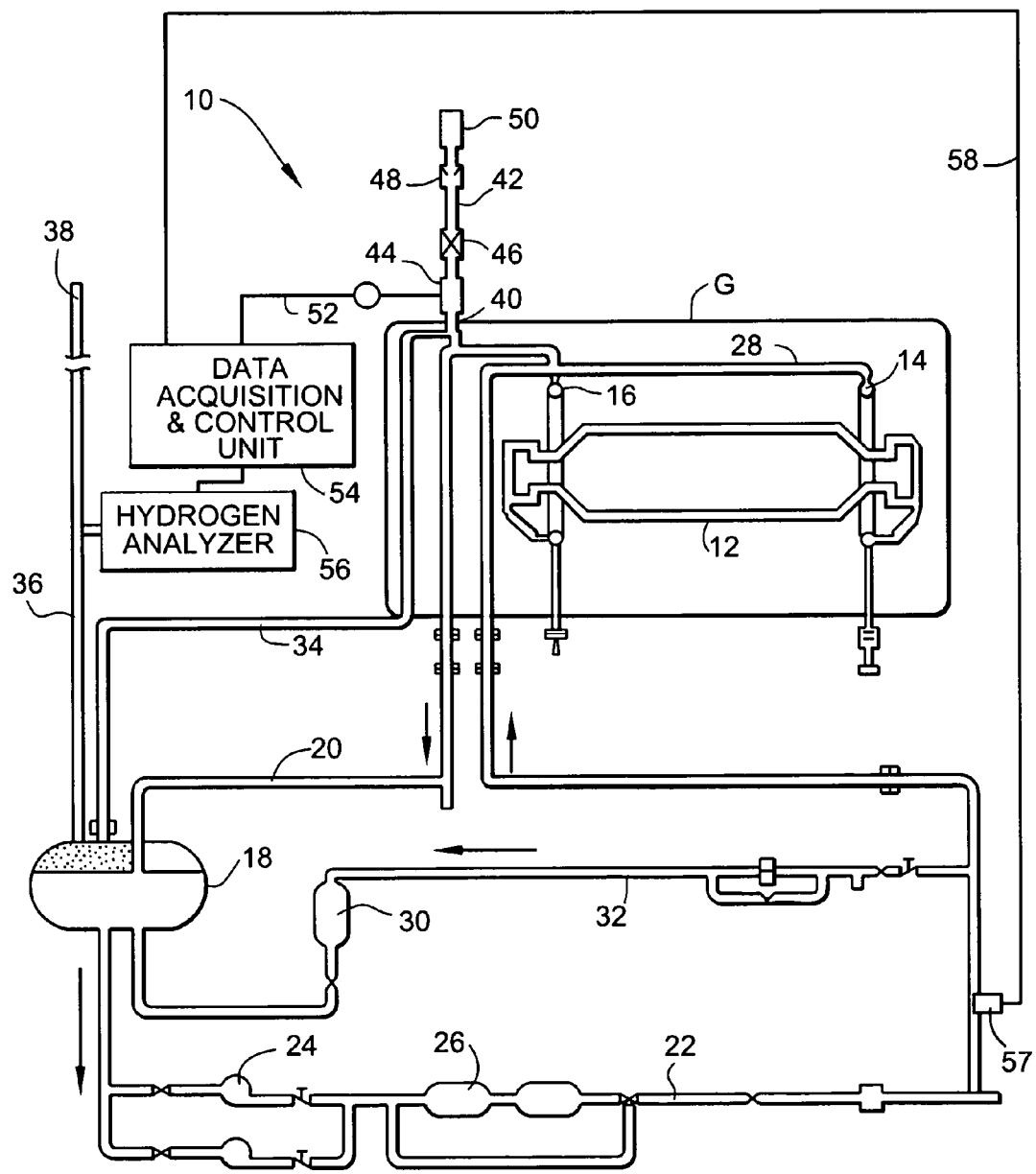

HIGH PERFORMANCE GENERATOR STATOR LEAK MONITORING SYSTEM

TECHNICAL FIELD

The present invention relates to methods of measuring hydrogen leakage through the stator windings of a generator into the generator coolant water. Particularly, the present invention relates to a method of determining hydrogen leakage from a generator core environment into the coolant water flowing through the stator windings of the generator with improved sensitivity and accuracy.

BACKGROUND OF THE INVENTION

The stator bar windings of generators of a certain size are typically water-cooled. That is, water flows from an inlet coolant water header into flow passages within the hollow copper strand stator bars and then flows outwardly into an outlet coolant header for flow into a reservoir. The coolant water is supplied to the windings via a closed loop system including a heat exchanger and a deionizer. Leaks in the stator windings of water-cooled generators, for example, at the brazed joints of the windings, can eventually cause insulation damage that can affect the reliability and longevity of the unit. Early detection of such leaks enables strategic testing and repair to be scheduled during minor outages, avoiding costly surprise replacements and extended outages. If early insulation damage is not discovered, the problem can quickly compound itself, as stator components are subject to thermal shock, cycling, corrosion and mechanical vibrations. This harsh environment causes and exacerbates leaks at a variety of locations, though most commonly at series loops and other brazed connections. These leaks will ultimately lead to a catastrophic in-service failure of the generator and forced removal from service if allowed to persist and grow unchecked.

It will be appreciated that in water-cooled generators, a cooling core hydrogen environment is normally maintained at a higher pressure than the coolant water flowing through the stator windings. This pressure difference, combined with stator component permeability of the Teflon flexible hoses causes a slight, barely detectable, flow of hydrogen into the coolant water under normal operating conditions even in a leak-free generator. However, when leaks actually develop, the quantity of hydrogen flowing into the coolant water increases slowly at first and at a dramatically increased rate as the leak path enlarges. By continuously or periodically monitoring the leakage flow of hydrogen into the coolant water, upward trending or step increases in the volume of hydrogen leakage can be used as a reliable indicator of water leaks and the potential for electrical insulation damage.

An additional concern involves the oxygenation level of the coolant water. With proper aeration, a tenacious and protective cupric oxide film advantageously forms on the inside surfaces of the copper windings. However, when the coolant water oxygen level drops too low, approximately 1 part per million (ppm), a less stable cuprous oxide layer is formed along these surfaces. This layer tends to break away from the winding surface, sloughing off base copper and introducing particles into the system. Oxygenation of the coolant water for generators is currently provided by air exchange through a vent line from the coolant water storage tank or reservoir to the atmosphere. Unfortunately, air in this line is relatively stagnant and the typical long length of the line, upwards of hundreds of feet in some installations, makes oxygen exchange difficult. Furthermore, significant hydrogen leaks may cause a constant outward flow of gas through this line, thus totally isolating the water from fresh air.

According to prior U.S. Pat. No. 5,492,004, there is provided a stator leak monitoring system which gives an on-line indication of a generator stator bar insulation condition, i.e., a winding leak, by measuring the volume of hydrogen escaping from the generator core into the stator bar water cooling system. The system also simultaneously oxygenates the coolant water by flowing air into the coolant water. More particularly, the stator leak monitoring system disclosed in the '004 patent, measures the volume of hydrogen that leaks from the generator core into the stator coolant water and uses this data as an indication of potential stator bar insulation damage. To accomplish the foregoing, an opening to the atmosphere is provided in the closed coolant water system adjacent the top of the generator where the coolant water exits the stator windings. At this location, coolant water flowing downwardly into the water reservoir creates a low-pressure area that induces an inward flow of air, i.e., air is aspirated into the coolant water. The exit flow through the vent for the reservoir is unidirectional but is not stable enough to be measured. Thus, air flow into the system is measured and the percentage of H2 in the gas exiting through the vent is determined whereby the total volume of H2 leaking out the vent can be ascertained. More specifically, the '004 patent discloses that the volume of hydrogen leaking or escaping from the generator core can be determined as follows:

$$H_{2(VOL)} = \frac{\%H_2}{1-\%H_2}(Inflow)(k)$$

where

% H2 is the fraction of H2 measured in the gas exiting the reservoir vent to atmosphere; Inflow is the rate of fresh air flowing into the system; and k is a conversion factor.

The inflow of air provides fresh air to mix with the coolant water as the water returns to the reservoir. This ensures that the coolant water has sufficient oxygen levels to avoid undesirable oxide formation on the winding surfaces. By locating a hydrogen gas analyzer for sampling gas flowing through the reservoir vent and locating a gas (air) flow meter at the inlet opening for the air into the system, the quantity of hydrogen in the vented gas stream can be measured as a percentage of total flow. Thus, the escaping hydrogen volume may be determined and the data interpreted as an indication of cooling system leaks.

Successful stator water leaks monitoring requires an accurate determination of the existence of a water leak from inception, and the ability to trend/track the progress of that leak(s). That is not done well currently, where a leak must be several times background levels of hydrogen permeation through Teflon hoses to establish that a true leak exists. Further in this regard, existing operating guidelines determine if there is a leak and whether it is minor, significant or major according to the following criteria:

Less than 3 cu. ft./day, considered background and not necessarily a water leak;

Greater than 3 and less than 10 cu. ft./day, one or more leaks present and maintenance required at next outage.

Greater than 10 and less than 30 cu. ft./day, significant leak or multiple leaks present with repairs recommended within 1 year or less.

Greater than 30 and less than 200 cu. ft./day, major leak present most likely from plumbing piping failure. Monitor continuously and repair ASAP.

Greater than 200 cu. ft./day, high possibility of major in-service failure, remove from service immediately.

More sensitive monitoring is desirable to more accurately identify leaks and the progress of such leaks over time.

BRIEF SUMMARY OF THE INVENTION

In an exemplary embodiment of this disclosure, it has been determined that the concentration of leaked hydrogen is increased by a factor of $10^+$ by reducing the air injection rate to less than 10% of its previous value. It will be appreciated, however, that the reduced air injection rate is still more than sufficient to maintain oxygenation saturation of the stator cooling water. By increasing the concentration of leaked hydrogen, the sensitivity of the system is significantly enhanced.

The increased sensitivity permits reliable detection of hydrogen leak rates as low as 0.2 CFD with sensitivity to 0.05 CFD. In addition, the system and process of leakage trending is sensitive enough to enable determination when leakage begins to exceed background permeation of hydrogen through hoses and actual leakage begins through defects (crevice corrosion, plumbing pipe failures, brazes, material flow, etc.)

The increased sensitivity also permits reliance on new assessment guidelines for predicting leak severity, source and progression, thereby providing a significantly improved process for providing recommendations to customers.

Accordingly, in one aspect, the invention relates to a method of measuring hydrogen leakage from a generator core into generator coolant water flowing through the generator stator windings comprising the steps of: providing a core hydrogen gas environment within the generator; flowing coolant water in a flowpath through the generator stator windings and a conduit to a coolant water reservoir; flowing air at a rate of less than 0.15 cubic foot per minute (CFM) into the conduit and the coolant water after the coolant water exits the stator windings; measuring the quantity of air flowing into the conduit and into the coolant water; venting gas through a vent line from a contained vapor space over the coolant water within the coolant water reservoir; and measuring the hydrogen content of the gas vented from the reservoir; whereby hydrogen leakage from the generator core environment through the stator windings into the generator coolant water can be determined in amounts down to about 0.2 cubic foot per day (CFD).

In another aspect, the invention relates to a method of measuring hydrogen leakage from a generator core into generator coolant water flowing through the generator stator windings comprising the steps of: providing a core hydrogen gas environment within the generator; flowing coolant water in a flowpath leading from a coolant water source inlet, then through the generator stator windings and a conduit to a coolant water reservoir; flowing air at a rate of less than 0.15 CFM into the coolant water; measuring the quantity of air flowing into the coolant water; venting gas through a vent line from a contained vapor space over the coolant water within the coolant water reservoir; and measuring the hydrogen content of the gas vented from the reservoir.

The invention will now be described in connection with the drawing FIGURE identified below.

BRIEF DESCRIPTION OF THE DRAWINGS

The single FIGURE is a schematic representation of a water cooling system for a generator employing the methods of the present invention.

DETAILED DESCRIPTION

Referring now to the drawing FIGURE, there is illustrated a water cooling circuit, generally designated 10, for a generator G. As well known, generator G includes a plurality of hollow stator bar windings through which water is circulated for cooling purposes. The cooling circuit through the stator bar windings is schematically illustrated at 12 and includes a water coolant inlet header 14 and a water coolant outlet header 16. The water coolant exiting the outlet header 16 is connected to a reservoir 18 by a water coolant return line or conduit 20. A water coolant supply line 22 supplies coolant water via pumps 24 and heat exchangers 26 to a water coolant inlet line 28 directly connected to the inlet header 14. A portion of the coolant water from the reservoir 18 flows through a deionizer 30 in a bypass line 32 which joins the water coolant supply line 22 downstream of heat exchangers 26. As a consequence of this arrangement, water coolant flows through the stator bar windings in a closed circuit.

Typically, a vent line 34 is disposed at the top of the generator tapped into the water coolant return conduit 20, the opposite end being connected to the reservoir 18. Vent line 34 is used to break any vacuum in conduit 20. Additionally, a second vent line 36 is connected between a contained vapor space above the coolant in the reservoir 18 and a suitable vent opening 38 for venting the gases above the coolant in the reservoir 18.

A system for detecting hydrogen leakage from the stator bar winding core environment into the water coolant, e.g., hydrogen leakage through the brazed joints of the end loop connections of the windings is incorporated into the circuit. Specifically, an opening 40 to atmosphere is provided at the water coolant exit or return line 20 from the outlet header 16. At the location of the opening 40, the coolant water flows downwardly to the reservoir 18, creating a low-pressure area that induces an inward flow of air. That is, the flow of coolant water from the outlet header 16 to the reservoir 18 aspirates air through the opening 40 into the outlet flow line 20. The opening may be provided in a line 42 having a flow meter 44, a gate valve 46, a check valve 48 and a filter 50. The flow meter 44 measures the flow rate of air aspirated in the system and is coupled by an electrical JQ output line 52 to a data acquisition and control unit 54. The opening 40 serves two purposes: (1) it increases the flow of gases from the reservoir through the vent line 34 such that the flow through the vent line will be unidirectional, enabling the percentage of H2 and thus the escaping hydrogen volume to be determined; and (2) the inflow of fresh air mixes with the coolant water as the water returns to the storage tank, thereby oxygenating the coolant water and providing sufficient oxygen levels to provide undesirable oxide formation on the interior surfaces of the windings. A hydrogen analyzer 56 continuously samples the gas in vent line 36 exiting the system through vent 38. Analyzer 56 measures the percentage of hydrogen in the air flowing through vent line 36.

In operation, the flow rate of air into the system through opening 40 is measured by the flow meter and the hydrogen analyzer 56 measures the percentage of hydrogen in the air flowing through the second vent line 36. Knowing that the total flow through the vent line 36 is equal to the air flow plus the hydrogen flow and that the hydrogen flow is a percentage of the total flow, the data acquisition unit 54 can compute the volume of hydrogen escaping into the otherwise closed stator cooling system. That is, the data acquisition unit 54 receives signals from the flowmeter 44 and the hydrogen analyzer 56 corresponding to the range of flow and range of hydrogen concentration, respectively. Unit 56 then calculates the volume flow rate of hydrogen by solving the equations:

Total Flow Through Vent 38($Qt$)=Air Flow (Qa)+Hydrogen Flow(Qh)

and $Qh$=Hydrogen Concentration(% $H_2$)×$Qt$.

Qa and % H2 are known measurements and the two equations can be solved for Qt and Qh. Thus, the escaping hydrogen volume is determined and the data is interpreted for possible cooling system leaks.

In an exemplary embodiment of this disclosure, the concentration of leaked hydrogen is increased by a factor of $10^+$ by reducing the air injection rate to less than 10% of its previous value of about 1.5 CFM, i.e., to a rate of less than 0.15 CFM. The sampling rate will be reduced as needed to avoid recirculation of sampled gas. It will be appreciated that the reduced air injection rate is still more than sufficient to maintain oxygenation saturation of the stator cooling water. More specifically, in the exemplary embodiment, the operating settings may be adjusted as follows:

Air injection rate 0.1 CFM

Air sample rate 1 CFH

Alarm set-point 1 CFD (or 200% of base reading whichever is greater).

The system is sensitive to hydrogen leakage detection down to about 0.2 CFD with accuracy of +0.05 CFD or better. For special conditions and testing, it is possible to detect lower levels of leakage by altering air injection and sampling rates. However, this is not desirable for normal continuous operation.

The enhanced sensitivity permits the assessment guidelines be revised as follows:

Less than 0.5 CFD and no change in trending—no leak, considered unavoidable background leakage;

0.5 to 1 CFD, strong possibility of leak. Observe trending, and an increase indicates leak present. Stable reading for 3-6 months indicates background leakage only.

1 to 2 CFD—small leak, inspect and repair at next planned maintenance outage;

2 to 5 CFD—medium leak (multiple leaks possible), inspect and repair at next planned maintenance outage but less than 24 months;

5 to 20 CFD—large leak (multiple leaks more likely), inspect and repair at next planned maintenance outage but less than 12 months;

greater than 20 to 200 CFD—major leak (plumbing failure likely). Schedule maintenance outage ASAP to inspect and repair, but complete within 12 months. Monitor continuously for change in leak rate until repairs made. Remove from service immediately if leak rate greater than 200 CFD or if leak rate is increasing rapidly (greater than 10 CFD change).

In addition, the system alarm can now be activated for levels of H in the vent air to warn of explosive gas mixture of 4%, the lower explosive limit for hydrogen-air mixture. A safety factor of 3 to 1 is employed here, and the alarm will be set to activate at the conservative limit of 1.33% of $H_2$ in air.

In addition, an opening is provided in line 22 for mounting an oxygen sensor, 57. The $O_2$ sensor will measure the oxygen content of the cooling water flow in parts per million (ppm) in line 22. The $O_2$ sensor 57 is connected by electrical line 58 to the data acquisition & control unit 54. Control unit 54 will monitor and record the levels of $O_2$ measured. An alarm will be provided in the control unit 54 to be activated if the oxygen level goes below a set value, typically 1 to 2 ppm.

In addition, filter 50 will be changed from a particulate and oil/fluid filter to one which includes a $CO_2$ filter element to it. The presence of $CO_2$ in air injected will decrease the functional life of the resin in the deionizer bed 30. Adding the $CO_2$ filter element to filter 50 will enable continued normal resin life.

With the increased sensitivity and accuracy, the detection of small, slowly progressing leaks such as those from crevice corrosion at the clip-to-strand connection, is enhanced and service outages can be more judiciously scheduled to minimize costs. For example, in the prior system, and as noted above, leaks up to 3 CFD were considered typical background leakage (permeation of H through the coolant hoses). Now, leaks as small as 0.3-1.0 CFD can be detected, and if trending upwardly, can be identified as water leaks not attributable to normal permeation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of measuring hydrogen leakage from a generator core into generator coolant water flowing through the generator stator windings comprising the steps of:

providing a core hydrogen gas environment within the generator;

flowing coolant water in a flowpath through the generator stator windings and a conduit to a coolant water reservoir;

flowing air at a rate of less than 0.15 CFM into said conduit and the coolant water after the coolant water exits the stator windings; measuring the quantity of air flowing into said conduit and into the coolant water;

venting gas through a vent line from a contained vapor space over the coolant water within said coolant water reservoir; and measuring the hydrogen content of the gas vented from the reservoir;

wherein flowing air at a rate of less than 0.15 CFM enables hydrogen leakage from the generator core environment through the stator windings into the generator coolant water to be determined in amounts down to about 0.2 CFD.

2. A method according to claim 1 wherein the step of flowing air into the coolant water includes inducing the flow of air through an opening in to said conduit and the coolant water by creating a low-pressure area in the flowpath of the coolant water within said conduit leading to the coolant water reservoir, the opening into the conduit being exposed to atmosphere.

3. A method according to claim 1 wherein the step of measuring includes providing a hydrogen gas analyzer in said vent line for sampling the gas vented from the reservoir to determine the fraction of hydrogen therein.

4. A method according to claim 1 comprising flowing air into said conduit at a rate of 0.10 CFD with said air filtered to remove CO2 as well as particulate and fluid contaminants.

5. A method according to claim 1 comprising activating a hydrogen gas alarm when the percentage of hydrogen in the air vented from the reservoir reaches no more than 4%.

6. A method according to claim 1 wherein the hydrogen gas alarm is activated when the percentage of hydrogen in the air vented from the reservoir reaches 1.33%.

7. A method of measuring hydrogen leakage from a generator core into generator coolant water flowing through the generator stator windings comprising the steps of;

providing a core hydrogen gas environment within the generator;

flowing coolant water in a flowpath leading from a coolant water source inlet, then through the generator stator windings and a conduit to a coolant water reservoir;

flowing air at a rate of between 0.1 and 0.15 CFD into the coolant water;

measuring the quantity of air flowing into the coolant water at an air sample rate of 1 CFH;

venting gas through a vent line from a contained vapor space over the coolant water within said coolant water reservoir; and measuring the hydrogen content of the gas vented from the reservoir down to about 0.2 CFD±0.05 CFD.

8. A method according to claim 7 comprising activating a hydrogen gas alarm when the percentage of hydrogen in the air vented from the reservoir reaches no more than 4%.

9. A method according to claim 7 wherein the hydrogen gas alarm is activated when the percentage of hydrogen in the air vented from the reservoir reaches 1.33%.

10. A method according to claim 7 and further comprising implementing leak assessment guidelines based on hydrogen content in the gas vented from the reservoir.

* * * * *